(12) United States Patent  
Sheu

(10) Patent No.: US 9,400,361 B2  
(45) Date of Patent: Jul. 26, 2016

(54) PHOTO-ELECTRIC CONVERTING MODULE WITH LOCATING POLE

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 183 days.

(21) Appl. No.: 14/175,994

(22) Filed: Feb. 7, 2014

(65) Prior Publication Data

US 2014/0332672 A1 Nov. 13, 2014

(30) Foreign Application Priority Data

May 8, 2013 (TW) .............................. 102116294 A

(51) Int. Cl.
G02B 6/42 (2006.01)

(52) U.S. Cl.
CPC .............. *G02B 6/4292* (2013.01); *G02B 6/426* (2013.01); *G02B 6/423* (2013.01); *G02B 6/4214* (2013.01); *G02B 6/4246* (2013.01)

(58) Field of Classification Search
CPC .... G02B 6/4214; G02B 6/423; G02B 6/4246; G02B 6/426; G02B 6/4292
See application file for complete search history.

(56) References Cited

U.S. PATENT DOCUMENTS

| 5,552,918 A * | 9/1996 | Krug | G02B 6/4246 385/33 |
| 2009/0072989 A1* | 3/2009 | Rock | G08B 27/00 340/691.1 |
| 2009/0310907 A1* | 12/2009 | Ikeda | G02B 6/43 385/14 |
| 2011/0216995 A1* | 9/2011 | Hodono | G02B 6/00 385/12 |

* cited by examiner

*Primary Examiner* — Francis M Legasse, Jr.  
(74) *Attorney, Agent, or Firm* — ScienBiziP, P.C.

(57) ABSTRACT

An optical-electric converting module includes a printed circuit board (PCB) and an optical-electric coupling element. The PCB includes a supporting surface, at least one laser diode, and at least one photo diode. The at least one laser diode and the at least one photo diode are positioned on the supporting surface and electrically connected to the PCB. The supporting surface defines at least one locating hole. The optical-electric coupling element includes a lower surface facing the supporting surface. The optical-electric coupling element defines a first cavity in the lower surface. The optical-electric coupling element includes at least one locating pole extending from the lower surface. The optical-electric coupling element is detachably connected to the supporting surface through the engagement of the at least one locating pole and the least one first locating hole, with each laser diode and each photo diode being received in the first cavity.

1 Claim, 5 Drawing Sheets

PHOTO-ELECTRIC CONVERTING MODULE WITH LOCATING POLE

BACKGROUND

1. Technical Field

The present disclosure relates to an optical-electric converting module.

2. Description of Related Art

An optical-electric converting module usually includes a circuit board, a number of light emitters, a number of light receivers, and an optical-electric coupling member. The light emitters and the light receivers are mounted on and electrically connected to the circuit board. The optical-electric coupling member includes a number of coupling lenses and is adhered to the circuit board with adhesive. Each of the light emitters and the light receivers is precisely aligned with a coupling lens. In use, light beams emitted by the light emitter project into the optical-electric coupling member through a coupling lens and are then emitted out from the optical-electric coupling member. External light beams are projected into the optical-electric coupling member, passing through a coupling lens, and are then are projected into a light receiver. The optical-electric coupling member is adhered to the circuit board by the adhesive and the adhesive may not be strong enough to withstand shocks and bumps, the optical-electric coupling member may shift when an external force is applied, resulting in misalignment between the coupling lenses and the light emitters and the light receivers.

Therefore, it is desirable to provide an optical-electric converting module which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
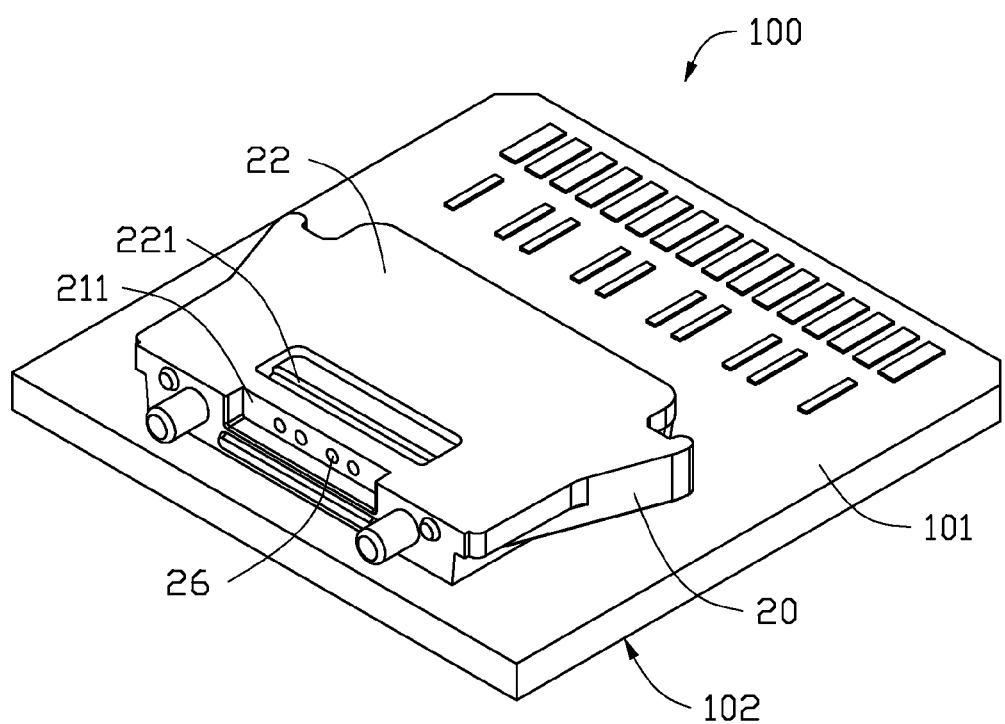
FIG. 1 is an assembled, isometric view of an optical-electric converting module, according to a first exemplary embodiment.
Figure 2:
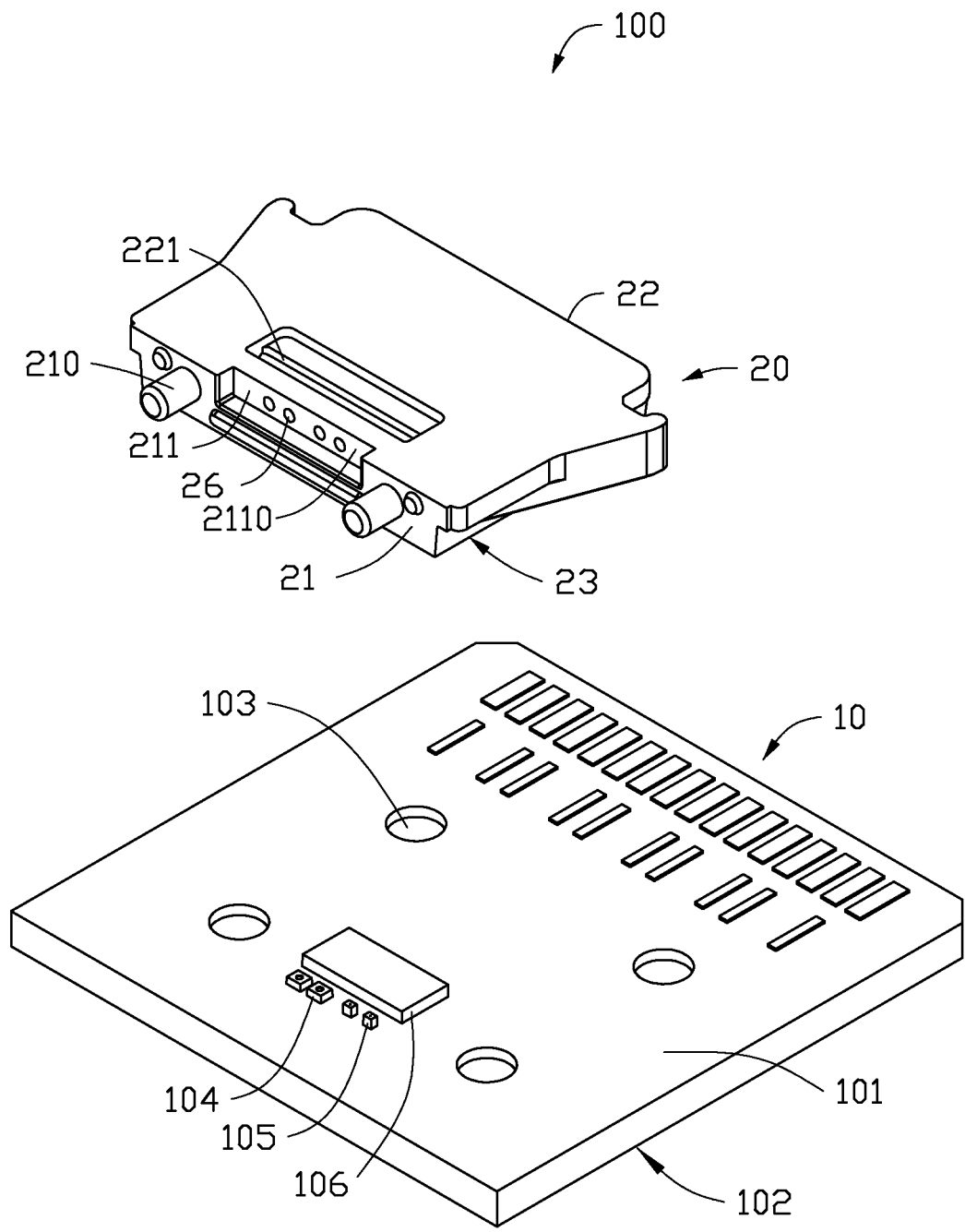
FIG. 2 is an exploded, isometric view of the optical-electric converting module of FIG. 1.
Figure 3:
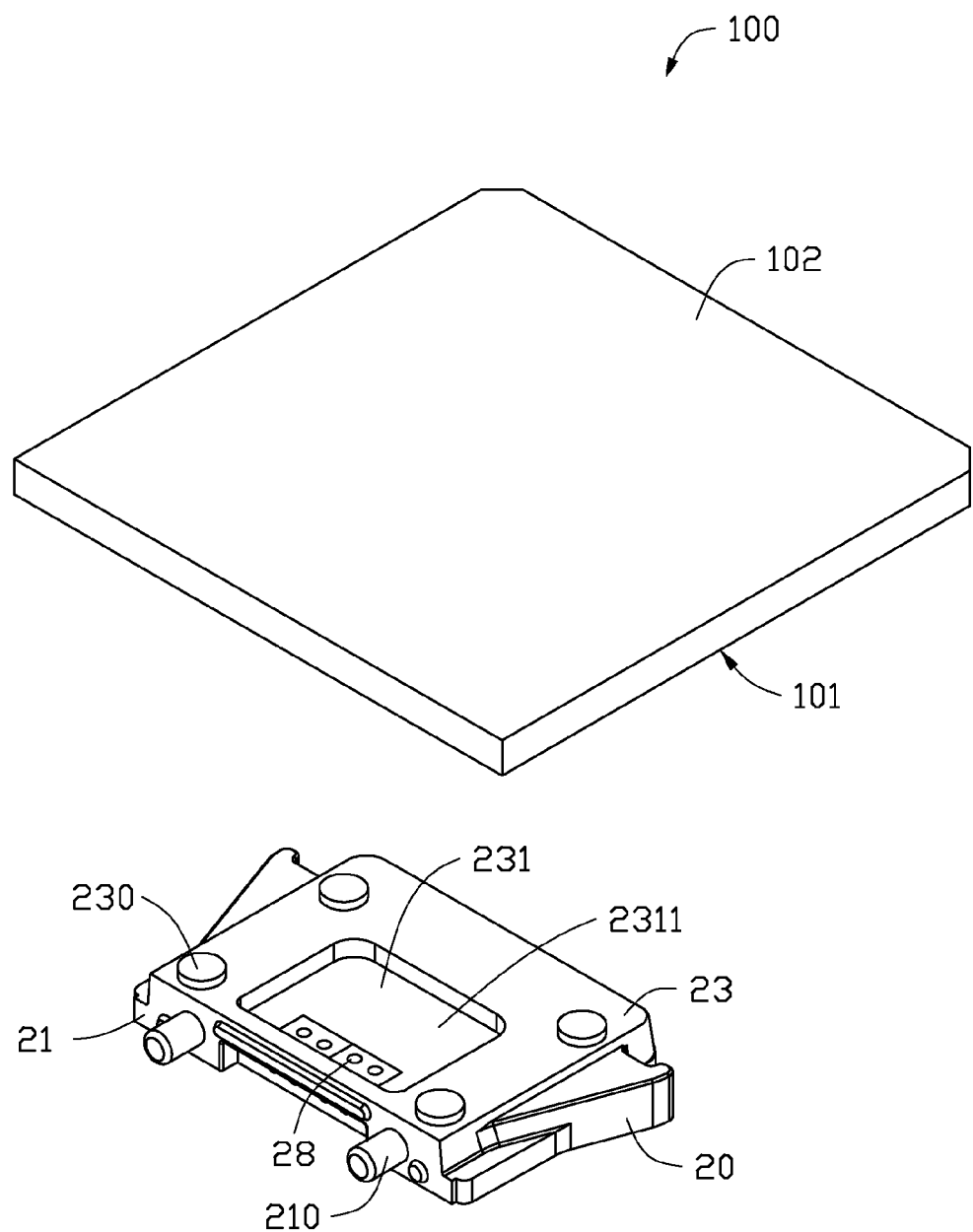
FIG. 3 is similar to FIG. 2, but viewed from another angle.

FIGS. 1-3 show an optical-electric converting module 100, according to a first embodiment. The optical-electric converting module 100 includes a printed circuit board (PCB) 10 and an optical-electric coupling element 20. The optical-electric coupling element 20 is detachably connected to the PCB 10.

The PCB 10 includes a supporting surface 101 and a rear surface 102 facing away from the supporting surface 101. The supporting surface 101 defines four locating holes 103. Four photoelectric conversion chips, such as two laser diodes 104 and two photo diodes 105, are positioned on the supporting surface 101. A driving chip 106 is also positioned on the supporting surface 101. The driving chip 106 connects with the two laser diodes 104 and the two photo diodes 105. The driving chip 106 drive the laser diodes 104 to emit light, in addition, is used for the demodulation of data in the light received by the photo diodes 105.

The optical-electric coupling element 20 includes a first side surface 21, an upper surface 22 and a lower surface 23 facing away from the upper surface 22. The upper surface 22 is substantially parallel to the lower surface 23. The first side surface 21 substantially perpendicularly connects the upper surface 22 to the lower surface 23. The optical-electric coupling element 20 defines a first cavity 231 in the lower surface 23, four first coupling lenses 28 are formed at bottom portion 2311 of the first cavity 231. In the embodiment, all of the first coupling lenses 28 are convex lenses and are integrally formed with the optical-electric coupling element 20.

The optical-electric coupling element 20 includes four locating poles 230 perpendicularly extending downwards from the lower surface 23. In the embodiment, each locating pole 230 spatially corresponds to one locating hole 103. The second locating poles 230 are symmetrical about and surround the first cavity 231. The shape and size of the locating poles 230 correspond to the shape and size of the locating holes 103. As such, when in assembling, the locating poles 230 are inserted into the locating holes 103 as a pinch fit to firmly attach the optical-electric coupling element 20 onto the supporting surface 101 of the PCB 10, with each of the first coupling lenses 28 aligning with a laser diode 104 or a photo diode 105. When in disassembling, the locating poles 230 are detached from the locating holes 103 via manually pulling the optical-electric coupling element 20 along a direction away from the PCB 10 or pulling the PCB 10 along a direction away from the optical-electric coupling element 20.

In the embodiment, the locating poles 230 are integrally formed with the optical-electric coupling element 20. Alternatively, the locating poles 230 and the optical-electric coupling element 20 may be separately formed. The locating poles 230 can be attached to the optical-electric coupling element 20 by adhesive, plastic welding or other attachment method. All of the second locating poles 230 have essentially identical height to promote even loading.

The optical-electric coupling element 20 also defines a second cavity 221 in the upper surface 22. The second cavity 221 includes a sloped surface 2211. An included angle between the upper surface 22 and the sloped surface 2211 is about 45 degrees. An angle between an optical axis of each first coupling lens 28 and the sloped surface 2211 is therefore about 45 degrees.

The optical-electric coupling element 20 also defines a receiving cavity 211 in the first side surface 21. The receiving cavity 211 includes a vertical surface 2110 substantially perpendicular to the upper surface 22. The vertical surface 2110 forms four second coupling lenses 26. In the embodiment, all of the second coupling lenses 26 are convex lenses and are integrally formed with the optical-electric coupling element 20. Each of the second coupling lenses 26 spatially corresponds to one of the first coupling lenses 28. Two positioning poles 210 perpendicularly extend upwards from the first side surface 21. In the embodiment, the two positioning poles 210 are symmetrical about the receiving cavity 211.

In use, light emitted from the two laser diodes 104 is directed into the optical-electric coupling element 20 by two of the first coupling lenses 28, and the light path is bent about 90 degrees by the sloped surface 2211. In the embodiment, the second coupling lenses 26 are positioned on the light path from the sloped surface 2211. As such, the light is finally reflected into two optical fibers (not shown) by the second coupling lenses 26. A process of the photo diodes 105 receiving light is the reverse of that of the laser diodes 104 emitting light.

In other embodiments, the numbers of the laser diodes 104, the photo diodes 105, the first coupling lenses 28 and the second coupling lenses 26 can be changed depending on need.

Figure 4:
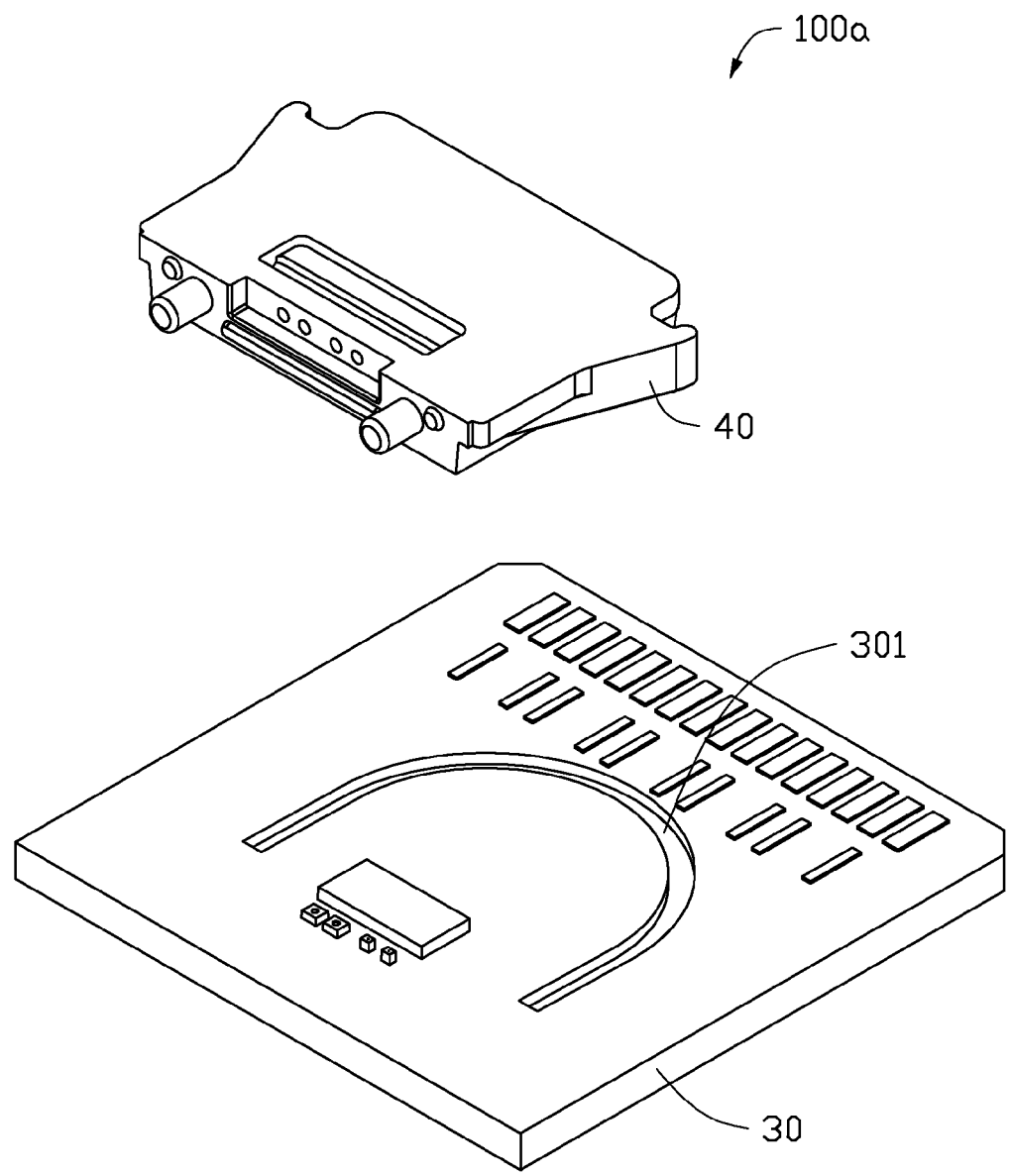
FIG. 4 is an exploded, isometric view of an optical-electric converting module, according to a second exemplary embodiment.
Figure 5:
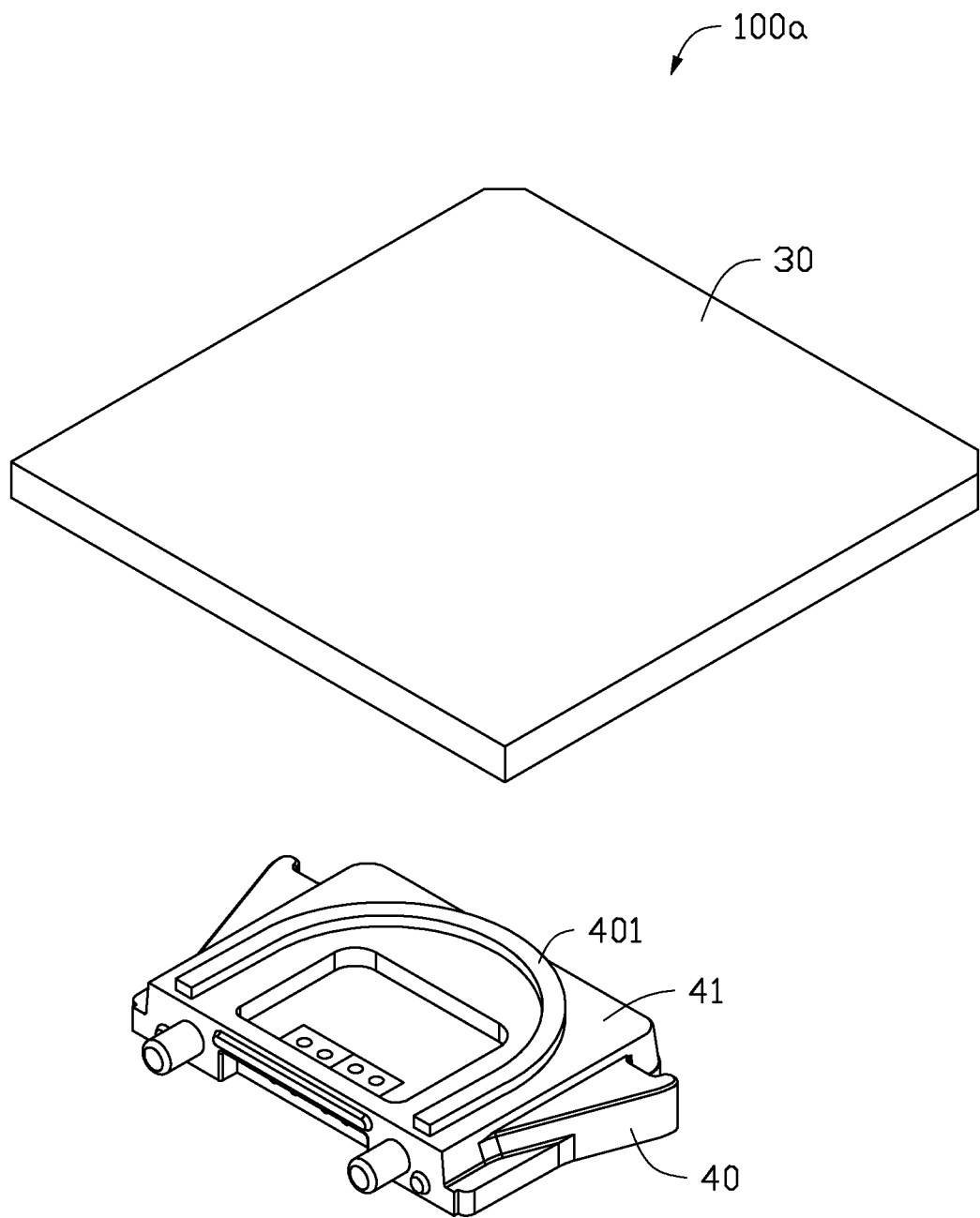
FIG. 5 is similar to FIG. 4, but viewed from another angle.

FIGS. 4-5 show an optical-electric converting module 100a, in accordance with a second exemplary embodiment. The optical-electric converting module 100a is essentially similar to the optical-electric converting module 100 in the first embodiment, except that the PCB 30 defines only one "U" shaped locating hole 301. The optical-electric coupling element 40 includes only one locating pole 401 perpendicularly extending downwards from the lower surface 41 and spatially corresponding to the locating hole 301. When disassembling, the locating pole 401 is detached from the locating hole 301 via pulling the optical-electric coupling element 40 along a direction away from the PCB 30 or pulling the PCB 30 along a direction away from the optical-electric coupling element 40.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical-electric converting module, comprising:
a printed circuit board (PCB) comprising a supporting surface, at least one laser diode and at least one photo diode, the at least one laser diode and the at least one photo diode positioned on the supporting surface and electrically connected to the PCB, the supporting surface defining at least one locating hole; and an optical-electric coupling element being detachably connected to the PCB and comprising a lower surface facing the supporting surface, the optical-electric coupling element defining a first cavity in the lower surface, the optical-electric coupling element comprising at least one locating pole perpendicularly extending downwards from the lower surface and spatially corresponding to the at least one locating hole, the optical-electric coupling element detachably connected to the supporting surface of the PCB through the engagement of the at least one locating pole and the at least one locating hole, with each laser diode and each photo diode being received in the first cavity;

wherein shape and size of the at least one locating pole corresponds to shape and size of the at least one locating hole;

wherein the PCB only defines a single "U" shaped locating hole, and the optical-electric coupling element only comprises a single "U" shaped locating pole perpendicularly extending downwards from the lower surface and spatially corresponding to the "U" shaped locating hole; and wherein the first cavity is rectangular, the single "U" shaped locating pole surrounding three sides of the first cavity in the lower surface.

* * * * *